(12) United States Patent
Gaege

(10) Patent No.: US 6,176,771 B1
(45) Date of Patent: Jan. 23, 2001

(54) GRINDING DISK FOR ELECTRIC HAND POWER TOOL

(75) Inventor: Goetz Gaege, Waiblingen (DE)

(73) Assignee: Robert Bosch GmbH, Stuttgart (DE)

( * ) Notice: Under 35 U.S.C. 154(b), the term of this patent shall be extended for 0 days.

(21) Appl. No.: 09/244,152

(22) Filed: Feb. 3, 1999

(30) Foreign Application Priority Data

Feb. 5, 1998 (DD) .............................. 198 04 408

(51) Int. Cl.[7] .................................................. B24D 17/00
(52) U.S. Cl. .................................. 451/490; 451/359
(58) Field of Search .................................. 451/357, 359, 451/533, 538, 539

(56) References Cited

U.S. PATENT DOCUMENTS

| | | | |
|---|---|---|---|
| 4,671,020 | * 6/1987 | Hutcins | 451/359 |
| 4,839,995 | * 6/1989 | Hutchins | 451/359 |
| 5,383,309 | * 1/1995 | Sampietro | 451/533 |
| 5,807,161 | * 6/1998 | Manor et al. | 451/538 |

* cited by examiner

Primary Examiner—Rodney A. Butler
(74) Attorney, Agent, or Firm—Michael J. Striker

(57) ABSTRACT

A grinding disk for an electric hand power tool has a support plate, a foam material body arranged on the support plate and composed of flexible polyurethane, and a burdock-shaped fabric which is pulled over the foam material body on a body surface facing away from the supporting plate, for fixing of a grinding members, the supporting plate being composed of a massive, non-foamed, viscous hard, polyurethane resin, and the foam material body being composed of a polyurethane reaction mixture which connects the supporting plate with the burdock-shaped fabric.

5 Claims, 1 Drawing Sheet

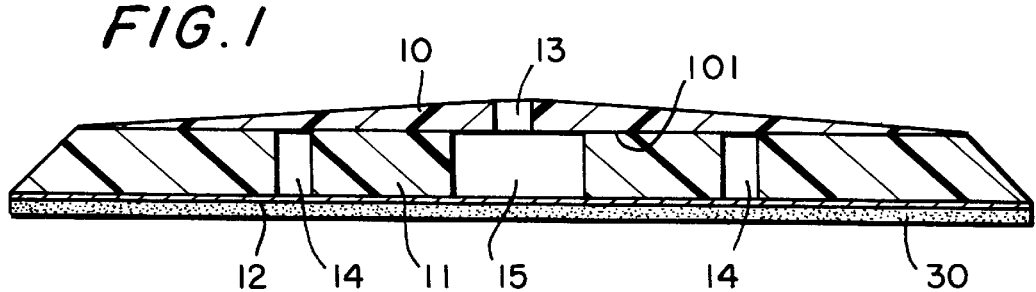
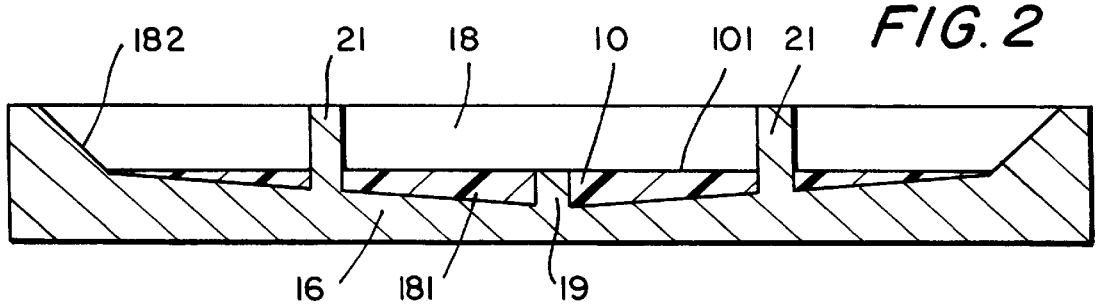
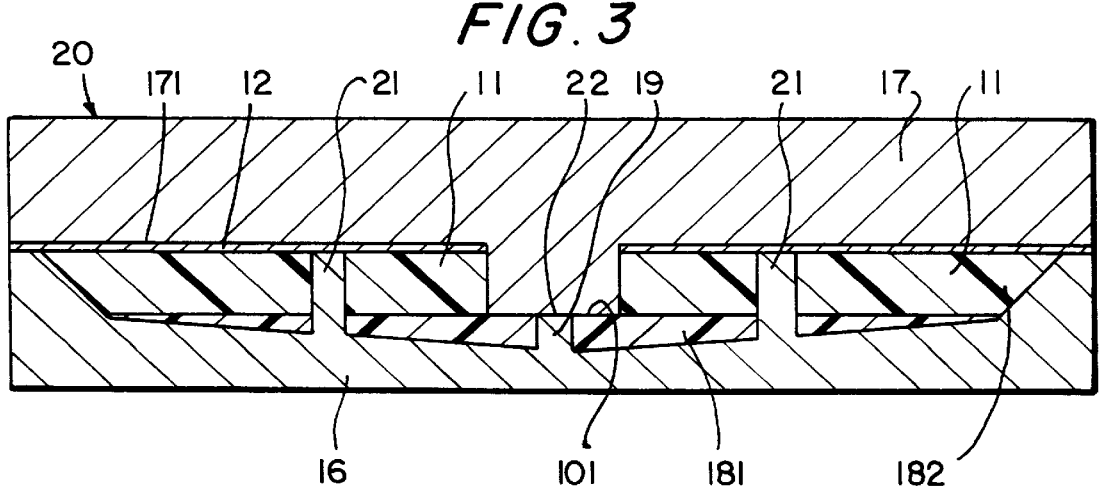

GRINDING DISK FOR ELECTRIC HAND POWER TOOL

BACKGROUND OF THE INVENTION

The present invention relates to a grinding disk for an electric hand power tool.

Grinding disks of the above mentioned general type are known in the art. In a known grinding disk of this type the supporting plate is formed as a stamped, black-lacquered steel plate and the burdock-type fabric as a cover sheet is formed on the foam material body of a flexible polyurethane. For obtaining a sufficient adhesive strength between the supporting plate of steel and the flexible polyurethane foam, an adhesive agent is spread on the supporting plate.

In another known grinding disk of this type, the supporting plate is composed of glass-fiber-reinforced polyamide, and the burdock-type fabric is also formed as a cover sheet on the foam body of polyurethane. For securing the adhesive strength of the foam material body on the supporting plate, the outer surface of the polyamide supporting plate is treated with reactive gas in a low pressure plasma process.

SUMMARY OF THE INVENTION

Accordingly, it is an object of present invention to provide a grinding disk for an electric hand power tool, which is a further improvement of the existing disks.

In keeping with these objects and with others which will become apparent hereinafter, one feature of present invention resides, briefly stated, in a grinding disk in which the supporting plate is composed of massive, non-foamed viscous hard polyurethane resin, and the foam material body is composed of a polyurethane reaction mixture which connects the supporting plate and the burdock-type fabric.

When the grinding disk is designed in accordance with the present invention, it has the advantage that the supporting plate composed of viscous hard, massive, non-foamed polyurethane resin is connected with the flexible polyurethane foam applied in a second working step, due to the chemical reactive groups located on the outer surface.

When compared with known grinding disks, it is not necessary during the manufacture to use the method steps of the steel treatment or the injection molding of thermoplastic material, so that due to saving of the punching and injection molding tools for the supporting plate, tool costs are reduced. Also, the utilization of health-hazardous and environmentally damaging adhesive agents is dispensed with, as well as the treatment of the support plate which is injection-molded from polyamide in a low pressure plasma.

Moreover, the recycling possibilities of the inventive grinding disk, for example by chemical glycolysis, is substantially simpler than for the known grinding disks.

The novel features which are considered as characteristic for the present invention are set forth in particular in the appended claims. The invention itself, however, both as to its construction and its method of operation, together with additional objects and advantages thereof, will be best understood from the following description of specific embodiments when read in connection with the accompanying drawings.

BRIEF DESCRIPTION OF THE DRAWINGS

FIG. 1 is a view showing a section of a grinding disk for an electric hand power tool in accordance with the present invention;

FIG. 2 is a view showing a longitudinal section of a lower part of a two-part casting tool for producing the grinding disk of FIG. 1; and FIG. 3 is a view showing a section through a lower and cover part of the two-part casting tool with a grinding plate enclosed in it.

DESCRIPTION OF PREFERRED EMBODIMENTS

A grinding disk for an electric hand power tool is shown in a cross-section in FIG. 1 and has a supporting plate 10 which is composed of a massive non-foam, viscous, hard polyurethane resin. A foam material body 11 composed of a flexible polyurethane is arranged on the supporting plate 10. A burdock-type fabric 12 is pulled on the body surface of the supporting plate 10 at a side facing away from the foam material body 11. The burdock-like fabric 12 serves for mounting of a grinding sheet 30 on the grinding disk.

The supporting plate 10 has an obtuse-angle conical shape with a plane abutment surface 101. The tip of the conical shape is flattened. The supporting plate 10 is provided with a coaxial opening 18 which is used for insertion of a holding pin for clamping in an electric hand power tool, for example in an eccentric grinding machine. The foam material body 11 is formed as a truncated-cone-shaped disk with a acute conical angle, which abuts with its smaller truncated cone surface against an abutment surface 101 of the supporting plate 10. Instead of truncated cone shape, the disk which forms the foam material body 11 can be also cylindrical.

A central throughgoing hole 15 is provided in the foam material body 11. Holes 14 for the grinding dust withdrawal are formed in the foam material body 11 and the supporting plate 10. The foam material body 11 of flexible polyurethane foam makes possible the treatment of a wavy and uneven surface. The force introduction through the eccentric rotation via the hard supporting plate 10 is performed with a central opening 13. The burdock-like fabric 12 holds therefore the grinding means, for example a grinding paper disk.

The grinding disk shown in FIG. 1 is produced with a casting tool 20 shown in a cross-section in FIGS. 2 and 3. The two-part casting tool 15 is composed of a lower part which forms the shaped body 16 and a cover 17 which is located on the shaped body 16 as an upper part. A hollow space 18 is formed in the shape body 16 and corresponds to the outer contours of the grinding disk. A shaped trough 181 is formed on the bottom of the hollow space 18 in the shaped body 16, and the periphery of the hollow space 18 forms the casing portion 181 of a truncated cone. In the case of the foam material body formed as a cylindrical disk, it forms the casing portion of the cylinder. The contour of the shaped trough 181 corresponds to the supporting plate 10. A coaxial shaped pin 19 extends from the bottom of the hollow space 18 on the one hand to the flat plane of the shaped trough 181 and serves for forming of the coaxial opening 18 in the support plate 10. On the other hand, shaped pins 21 extend to the upper edge of the shaped body 16 and serve for forming of the opening 14 in the foam material body 11 and the support plate 10.

The cover 17 closes the hollow space 18 completely with a flat cover surface 171 and carries a coaxial shaped pin 22 extending axially from the flat cover surface 171. When the cover 17 is set on the shaped body 16 it extends to the flat plane of the shaped trough 181 and serves for forming of the central throughgoing hole 15 in the foam material body 11. Simultaneously the shape pin 32 also serves for fixing the burdock-shaped fabric 12 which is laid on the flat cover surface 171 prior to the placing of the cover 17 on the shaped body 16. The casting tool 20 with the shaped body 16 and the cover 17 is composed of aluminum or silicone rubber.

During the manufacturing process of the grinding disk, a reaction mixture of massive, non-foamed, viscous hard and preferably black painted polyurethane resin is produced by a two-component mixing or dosing machine. It is cast into the shaped body 16 until it completely fills the shaped trough 181 of the hollow space 18. This is shown in FIG. 2. Then the cover 17 with the burdock-shaped fabric 12 placed on the cover surface 171, is placed on the shaped body 16. After hardening of the polyurethane resin which forms the supporting plate 10 in the shaped body 181, which usually requires approximately one-two minutes, the polyurethane foam-reaction mixture is cast in the hollow space 18. It forms, with a volume increase, the flexible foam material body 11. The burdock-shaped fabric 12 which lies on the cover 17 is connected with the flexible polyurethane foam. After opening of the casting tool 20, the complete grinding body is removed from the shaped body 16, and the burdock-shaped fabric 12 which projects outwardly beyond the edge is cut off.

It will be understood that each of the elements described above, or two or more together, may also find a useful application in other types of constructions differing from the types described above.

While the invention has been illustrated and described as embodied in grinding disk for electric hand power tool, it is not intended to be limited to the details shown, since various modifications and structural changes may be made without departing in any way from the spirit of the present invention.

Without further analysis, the foregoing will so fully reveal the gist of the present invention that others can, by applying current knowledge, readily adapt it for various applications without omitting features that, from the standpoint of prior art, fairly constitute essential characteristics of the generic or specific aspects of this invention.

What is claimed as new and desired to be protected by Letters Patent is set forth in the appended claims.

What is claimed is:

1. A grinding disk for an electric hand power tool, comprising a support plate; a foam material body arranged on said support plate and composed of flexible polyurethane; and a burdock-shaped fabric which is pulled over said foam material body on a body surface facing away from said supporting plate for fixing of grinding means, said supporting plate being composed of a massive, non-foamed, viscous hard, polyurethane resin, and said foam material body being composed of a polyurethane reaction mixture which connects said supporting plate with said burdock-shaped fabric, said support plate being cast, said polyurethane reaction mixture being cast of a rigidified polyurethane resin and covered with said burdock-shaped fabric, said support plate having an obtuse-angle conical shape with a flat abutment surface for said foam material body, said foam material body being formed as a cylindrical disk with an acute cone angle and with a smaller truncated cone surface abutting against said supporting plate.

2. A grinding disk for an electric hand power tool, comprising a supporting plate; a foam material body arranged on said supporting plate and composed of flexible polyurethane; and a burdock-shaped fabric which is pulled over said foam material body on a body surface facing away from said supporting plate for fixing of grinding means, said supporting plate being composed of a massive, non-foamed, viscous hard, polyurethane resin, and said foam material body being composed of a polyurethane reaction mixture which connects said supporting plate with said burdock-shaped fabric.

3. A grinding disk as defined in claim 2, wherein said support plate is cast, said polyurethane reaction mixture being cast of a rigidified polyurethane resin and covered with said burdock-shaped fabric.

4. A grinding disk as defined in claim 2, wherein said support plate has an obtuse-angle conical shape with a flat abutment surface for said foam material body, said foam material body being formed as a cylindrical disk with an acute cone angle and with a smaller truncated cone surface abutting against said supporting plate.

5. A grinding disk as defined in claim 2, wherein said support plate has an obtuse-angle conical shape with a flat abutment surface for said foam material body, said foam material body being formed as a truncated-cone-shaped disk with an acute conical angle and with a smaller truncated cone surface abutting against said supporting plate, said support plate having a flattened upper side without any tip.

* * * * *